United States Patent [19]

Maddock

[11] Patent Number: 4,656,320

[45] Date of Patent: Apr. 7, 1987

[54] CORD REEL

[75] Inventor: William H. Maddock, Markham, Canada

[73] Assignee: Noma Inc., Scarborough, Canada

[21] Appl. No.: 581,731

[22] Filed: Feb. 21, 1984

[51] Int. Cl.⁴ .......................................... H02G 11/02
[52] U.S. Cl. ..................................... 191/12.4; 242/96
[58] Field of Search .................... 191/12.2 K, 12.4; 242/86, 96; 310/68 C

[56] References Cited

U.S. PATENT DOCUMENTS

| | | | |
|---|---|---|---|
| 2,801,303 | 7/1957 | Pailing | 191/12.4 |
| 3,837,448 | 9/1974 | Hagstrom | 191/12.4 |
| 4,244,536 | 1/1981 | Harrill | 191/12.4 X |
| 4,282,954 | 8/1981 | Hill | 191/12.4 |
| 4,338,497 | 7/1982 | Drew | 191/12.4 |
| 4,467,979 | 8/1984 | Koehler | 191/12.4 X |
| 4,520,239 | 5/1985 | Schwartz | 191/12.4 |

FOREIGN PATENT DOCUMENTS 2444807  4/1976  Fed. Rep. of Germany ..... 191/12.4

Primary Examiner—Robert B. Reeves
Assistant Examiner—David F. Hubbuch
Attorney, Agent, or Firm—Kenneth M. Garrett

[57] ABSTRACT

A cord reel for an extension cord comprises a housing and a hub mounted for rotation from the housing. A convenience receptacle is provided in the hub of the reel. The electrode supporting structure of the receptacle is relatively open, whereby water can drain therefrom to permit the reel to be used under moist conditions in relative safety. A circuit breaker connected serially with the cord mounts in the hub so as to be at least in part responsive to thermal build up within the housing.

8 Claims, 5 Drawing Figures

CORD REEL

FIELD OF INVENTION

This invention relates to cord reels for electrical extension cords.

BACKGROUND OF INVENTION

It is often desired to use the cord reel outdoors, wherein it is subject to exposure to the elements. In early commercial embodiments, convenience receptacles manuactured primarily for domestic house wiring were used as outlets in the cord reels. Such receptacles have electrodes which are closely surrounded by a flame proof housing structure; the housing normally comprises a back wall which is closed but not sealed to side walls. In U.S. Pat. No. 4,338,497 to Drew, commonly assigned herewith, there was taught a cord wherein the receptacle outlet was of a type wherein the electrodes were molded into a housing that was sealed, other than for the prong openings of the receptacle. It has been found that these closed types of receptacle are not wholly suited for use in outdoor conditions, as they tend to trap water therein.

The normal current carrying capacity of electrical cords assumes their use in an uncoiled, free air condition. When the cords are coiled, particularly on enclosed reels, appreciable heat build up may occur to the point where a fire hazard is possible. For this reason cords which are capable of being used in their reeled condition are, in accordance with most regulatory requirements, rated at below their free air capacity, and the cord reel is required to include a current limiting device connected serially with the cord. Past commercial practice appears to have been to include the current limiting device in the free end of the cord. While in this location it is sensitive to the current carried by the cord, it cannot sense the actual thermal build-up on the reel, which may vary widely under identical loads in accordance with particular conditions of use of the cord reel.

OBJECTS OF INVENTION

It is an object of my invention to provide in a cord reel improvements in the electrical construction thereof.

SUMMARY OF INVENTION

It have found that where the electrodes of the convenience receptacle outlet of a cord reel or like device are mounted within a housing by a support structure which is predominantly open, then moisture such as may adventitiously enter therein may drain relative freely therefrom, to permit the use of the device at least under moist conditions of use. By the term "open support structure" I mean structure that retains the electrodes in fixed position behind the front cover of the receptacle, which is to say the face of the receptacle having openings therein for receiving the prongs of a male connector to be connected to the electrodes, without closely surrounding the electrodes so as to trap water therein. Generally speaking, if movement of the electrodes is constrained by mechanical means such as walls, the juncture points where various walls interconnect will be restricted, particularly where walls in two or more planes interconnect. Desirably also the spatial separation between the electrodes and the supporting walls therefor will be such as to not trap water therebetween by capillary action. Preferably the back wall of the housing which acts to preclude physical access to the electrodes, will be spaced apart from other electrode supporting walls.

Expediently, the receptacle housing forms a structural member for retaining other portions of the cord reel in operational relationship. Preferably the receptacle housing is formed in a first material having preferred electrical characteristics and the other structural portions of the cord reel from other materials having preferred mechanical characteristics.

I have further found that where a circuit breaker is used as a load limiting device for the cord reel, it is beneficially located in a position wherein it may sense thermal build up in the extension cord when coiled on the reel. In such location, when the temperature within the cord reel is elevated, the circuit breaker will tend to trip under a lower load condition than would a comparable circuit breaker located in a position wherein it is not responsive to the operation temperature of the cord reel. As a corollary, where the circuit breaker locates in a position where it is sensitive to thermal build up in the cord reel, it may be selected to have a higher load rating than a circuit breaker which is not sensitive to thermal build up. Typically, a cord reel having a 15 m extension cord having a free air load capacity of 15 amps may be protected by a circuit breaker having a load rating of about 13 amps when the circuit breaker is located in a thermally sensitive position, whereas a circuit breaker located in a position where it senses only the current load would be required to have a rating of about 10 amps.

My invention will be further described in relation to a preferred embodiment thereof, taken in conjunction with the accompanying drawings.

BRIEF DESCRIPTION OF THE INVENTION

DESCRIPTION OF THE PREFERRED EMBODIMENT

Figure 1:
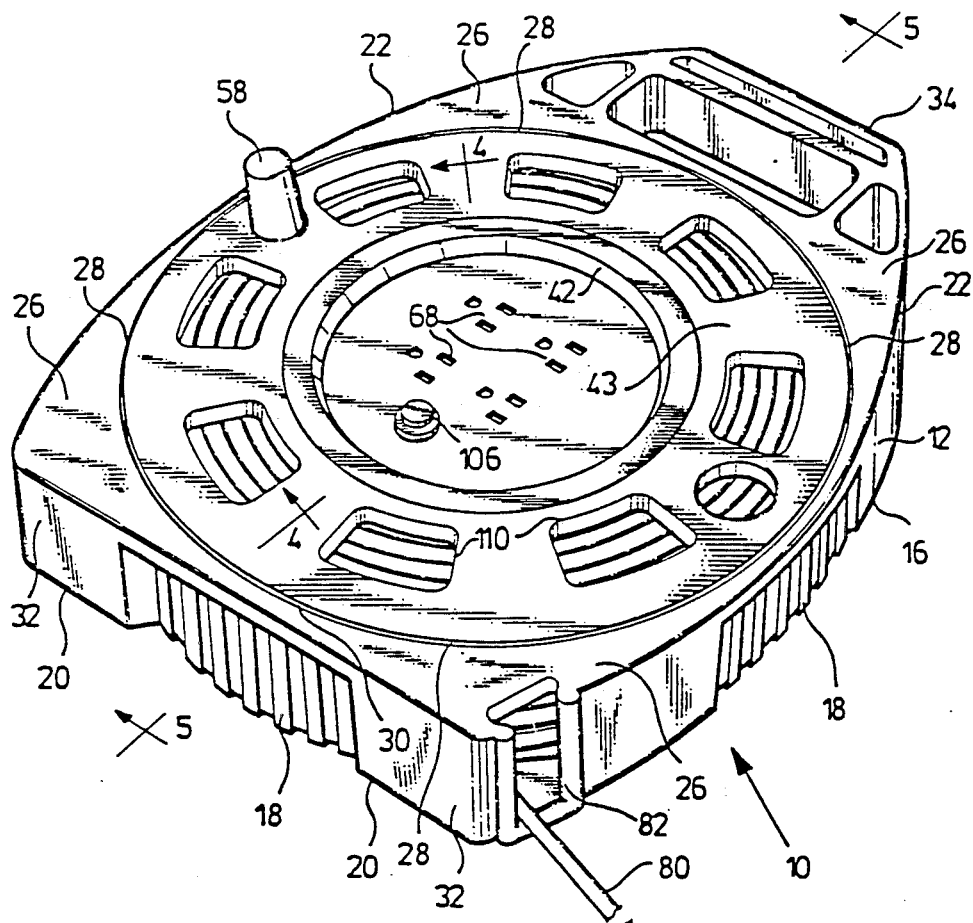
FIG. 1 shows a cord reel in general perspective view.
Figure 2:
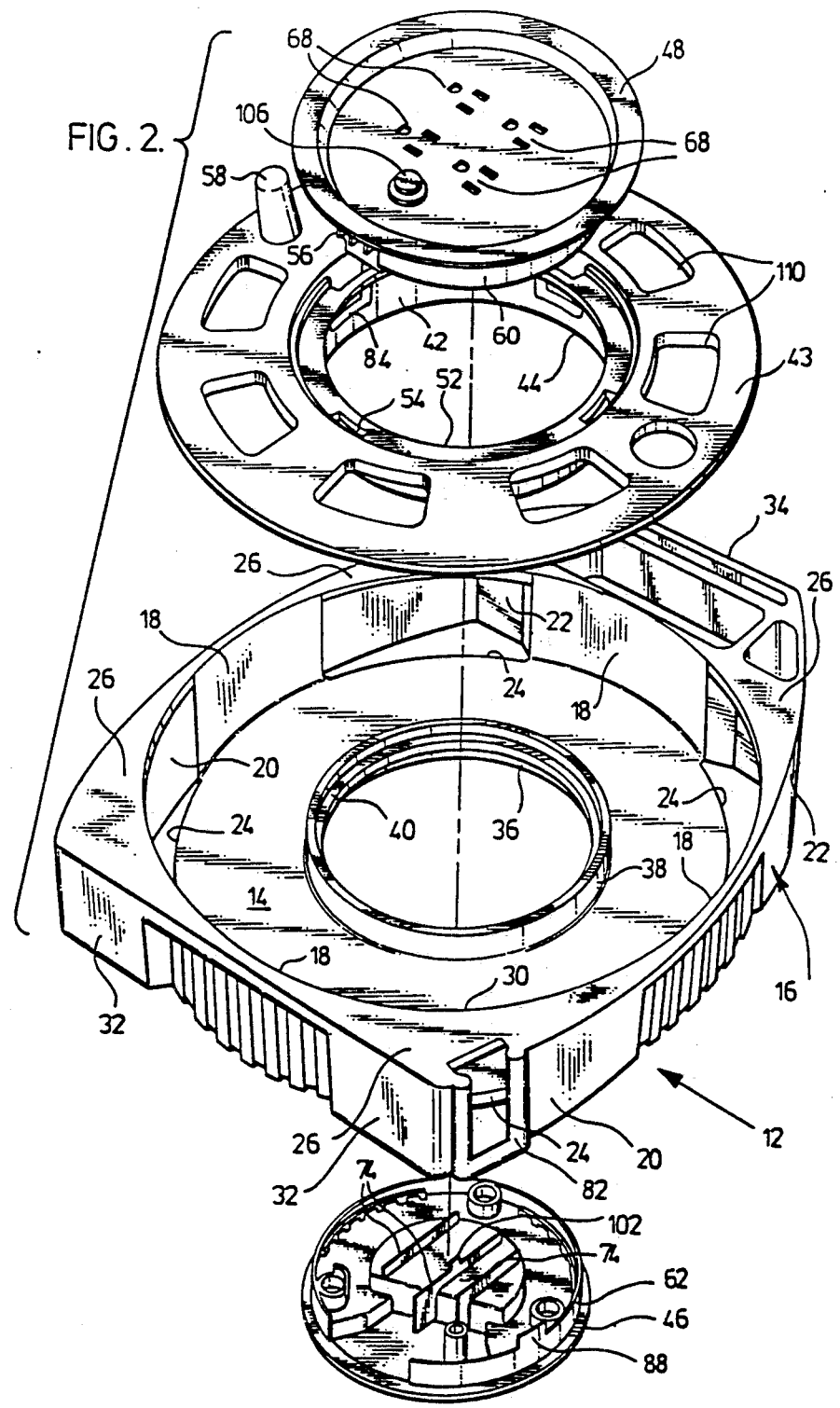
FIG. 2 shows the cord reel of FIG. 1 in exploded view with the electrical cord removed for clarity.

Referring to the drawings in detail, a cord reel is identified generally therein by the numeral 10. Cord reel 10 comprises a housing 12 including an annular radial wall 14 surrounded by a peripheral wall 16 which includes four portions 18 having a common radius of diameter centered on the centre of radial wall 14 and interconnected by lower shoulders 20 and upper shoulders 22 which are hollow. The shoulders 20,22 are open sided in the plane of radial wall 14, at 24. Fillets 26 close the shoulders 20,22 at the opposed axial end thereof, the fillets having an inwardly facing edge 28 which has an identical radius of curvature to peripheral wall portions 18, thereby forming a circular opening 30 in one axial side of the housing. The lower surface 32 of the lower pair of shoulders 18 is planar, whereby these shoulders serve to maintain housing 12 an upright position when desired. A handle 34 for carrying cord reel 10 connects between upper shoulders 20.

Radial wall 14 has a relatively large circular opening 36 centrally located therein surrounded on the interior wall face of the radial wall by an annular wall 38, this last wall having a lip 40 on one surface thereof. Cord reel 10 further comprises a hollow, open ended hub 42, having an annular cheek wall 43 radiating from one axial end thereof, the diameter of the cheek wall being marginally less than the diameter of opening 30 in housing 12. The bore opening of hub 42 is such that the hub is a loose, telescopic fit about wall 38, the wall forming a trunnion bearing for the hub. The axial position of the hub is maintained by the distal end 44 of the hub which bears on the inner wall surface of radial wall 14, the hub being dimensioned so that cheek wall 43 then lays in the plane of opening 30. Hub 42 is retained in housing 12 by a cover plate 46 which inserts into opening 36 and engages lip 40. Cover plate 46 secures to a second cover plate 48 by machine screws 50, which engages a flange 52 formed on the interior wall of the hub adjacent cheek 43. Flange 52 is provided with openings 54 therein, and cover plate 48 with tabs 56 which engage with openings 54 so as to maintain the cover plate 48 in fixed, predetermined relationship with hub 42. A handle 58 extends from cheek wall 43 for imparting a rotary movement to hub 42. Cover plate 48 is provided with a concentered annular skirt wall 60 on the inner surface thereof, and cover plate 46 with a similar wall 62, although of lesser axial extent, which is telescopically received in skirt wall 60, the cover plates and skirt wall acting to form an enclosure 64 within hub 42. Cover plate 46 is provided with a plurality of small apertures 66 about the periphery thereof to assist in draining water which may be adventitiously introduced into enclosure 64.

Figure 3:
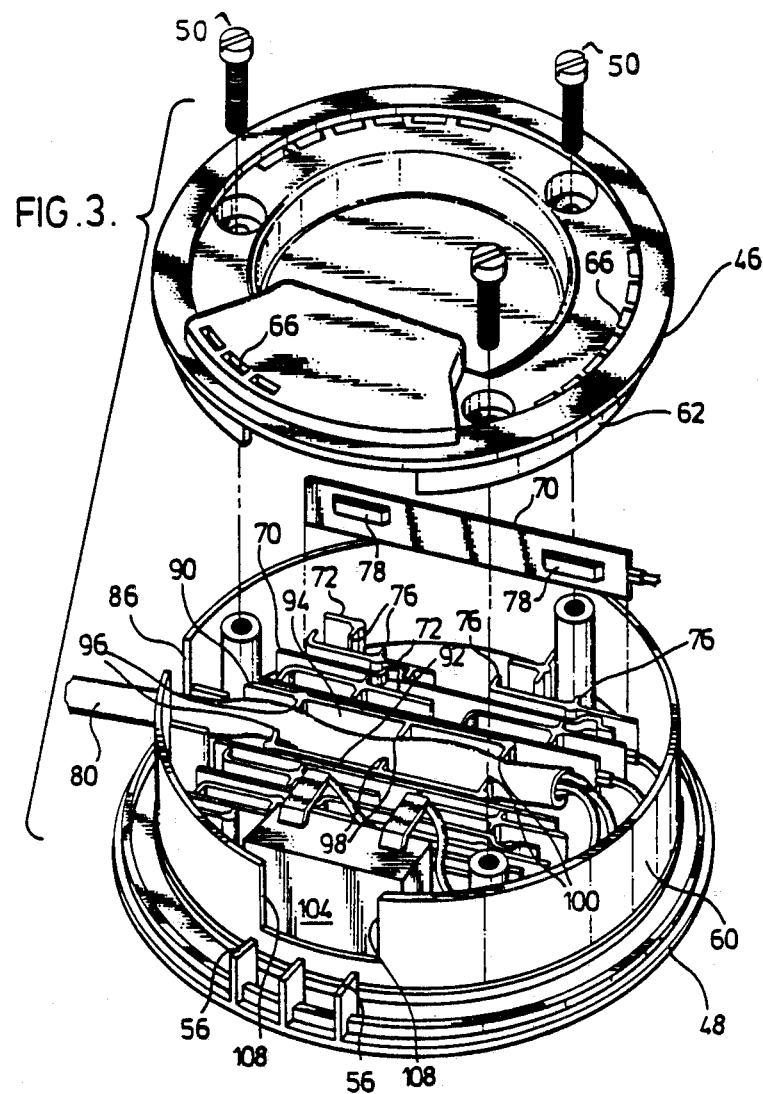
FIG. 3 shows in exploded view top and bottom components of FIG. 2 inverted and on a larger scale; with a portion of electrical cord connected thereto, and with one electrode in a disassembled position.
Figure 4:
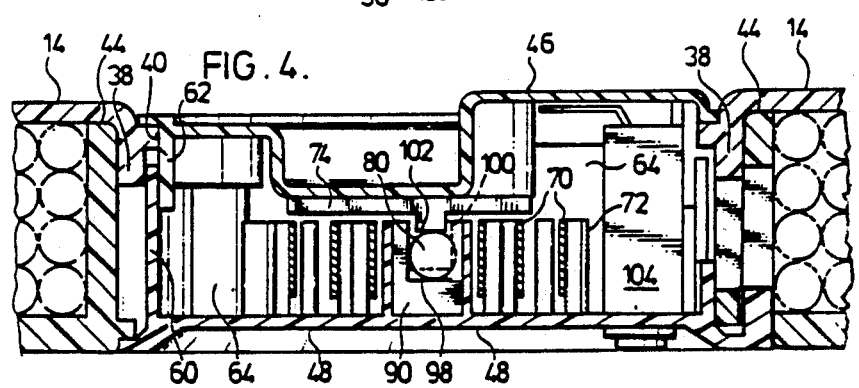
FIG. 4 is a section on 4—4 of FIG. 1, also shown inverted so as to be more readily understood in conjunction with FIG. 3.
Figure 5:
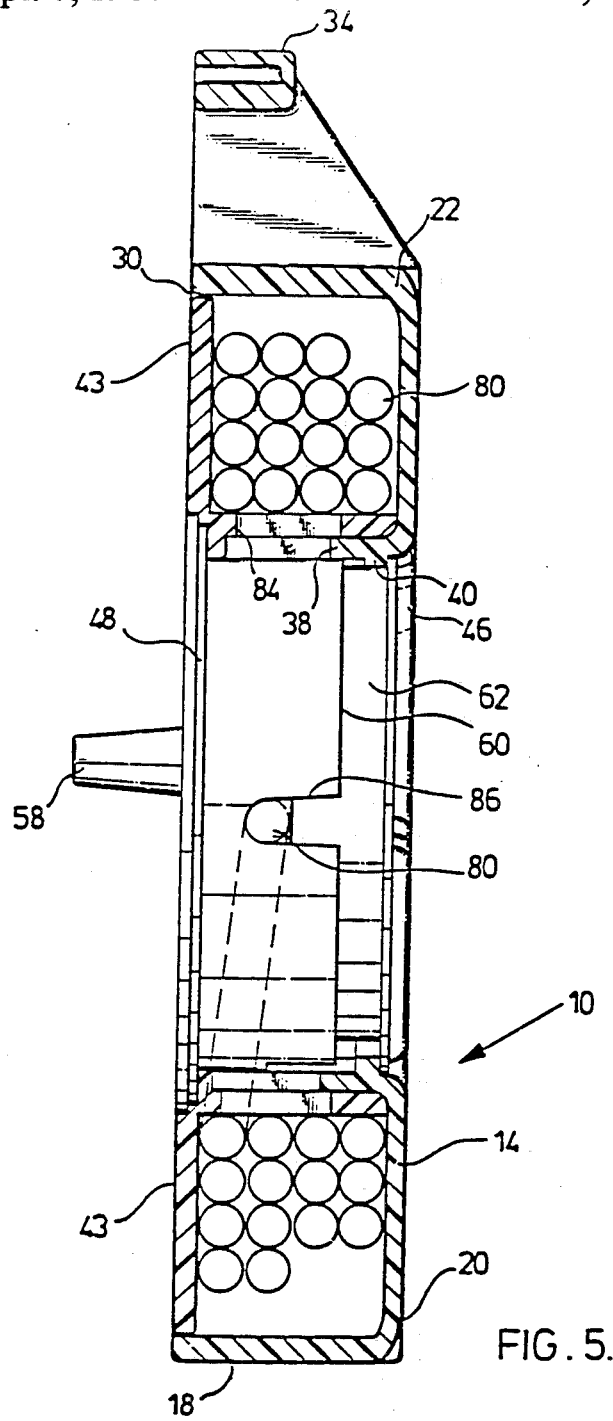
FIG. 5 is a section along line 5—5 of FIG. 1 of the cord reel having, showing the interior of the hub in elevation.

Cover plate 48 has a plurality of openings 68 in the face thereof extending therethrough for receiving the prongs of an electrical connector therein. A plurality of strip electrodes 70, best seen in FIG. 3, underlay prong openings 68. Electrodes 70 are supported in radial directions by ribs 72 formed on the inner surface of cover plate 48, and axially by further ribs 74 formed on the inner surface of cover plate 46 transverse to ribs 72 when the cover plates are in their assembled relationship. Ribs 72 are provided with small transverse protrusions 76 which cooperate with transverse protrusions formed as part of the electrode structure, for example those referenced by the numeral 78, and which also function to stand the electrodes off from the ribs, so as not to trap moisture between the ribs and the electrodes by capillary action. The ribs provide an open support structure for the electrodes which facilitates the drainage of water such as may be adventitiously introduced thereto through prong openings 68.

Cord reel 10 further comprises an electrical cord 80 which is storable on hub 42, and which may be withdrawn from housing 12, an opening 82 being provided in peripheral wall 16 for this purpose. A further opening 84 is formed in hub 42 to permit the passage of cord 80 therethrough. A still further slotted opening 86 is provided in skirt wall 60 of cover plate 48. Opening 84 is displaced from opening 54 by the same degree as opening 86 is displaced from tabs 56, whereby openings 84 and 86 are maintained in alignment to permit the passage of cord 80 to the interior of enclosure 64.

Cord 80 is generally round, and has a nominal diameter of 8.5 mm. The width of hub 42, measured between the inner surfaces of radial housing wall 14 and cheek wall 43 has a dimension of some 36 mm, thereby permitting only four side by side turns of the cord in a layer of windings on the hub. It is found that with only four turns per layer a relatively regular winding of cord 80 onto hub 42 takes place as the hub is rotated, notwithstanding the absence of any cord feeding mechanism to control the lateral placement of the cord on the hub. Cord 80 is anchored to hub 42 by a tab 88 which projects below the periphery of wall 62 of cover plate 46, and which closes slotted opening 86 and acts to compress cord 80 therein. Slotted opening 86 is in general alignment with a maze 90 which comprises opposed ribs 92,94 formed on the inner surface of cover plate 48 generally parallel to ribs 72, having gate openings 96,98 and 100 therebetween which are staggered in the radial and axial directions to permit cord 80 to be threaded therethrough along a serpentine path. A tab 102 projects centrally from a rib 74 formed on the inner surface of cover plate 46 to urge cord 80 into gate 98, which is somewhat lower than the adjacent gates 96 and 100.

The ground and return line conductors of cord 80 are connected directly to electrodes 70. The line conductor is serially connected to a circuit breaker 104, which in turn connects to an electrode 70. The connections are of a wholly conventional nature in themselves, and are not particularly illustrated. Circuit breaker 104 is supported within enclosure 64 from cover plate 48 and has a reset button 106 accessible on the outer surface of the cover plate. The body of circuit breaker 104 locates adjacent an opening 108 provided in skirt wall 60 of cover plate 48, which in turn aligns with an opening in hub 42 similar to opening 84 earlier described. In practice, four openings 84 and four openings 54 are provided in hub 42, spaced apart by 90°; this facilitates the assembly of the cord reel by providing a degree of symmetry to the hub, and an automatic indexing of the cover plates in relation to the position of cord 80. Circuit breaker 104 is of a conventional structure, and for this reason the internal structure thereof is not specifically illustrated; such structure comprises a self heating bimetallic strip which triggers contacts to an open circuit position under given load conditions. The location of the circuit breaker 104 adjacent a window opening 84 in the hub 42 ensures that the circuit breaker will be in part responsive to any thermal build up caused by operating cord 80 when in its stored position. Thus, the circuit breaker 104 will tend to trip under lower current loads when the cord reel is used with the cord stored thereon than when the cord is withdrawn from the reel. As a corollary, the long term overload trip current rating of circuit breaker 104 may be appreciably higher than where the circuit breaker is situated in a position where it is not sensitive to thermal build up within the cord reel. Thermal build up within housing 12 is reduced by providing a plurality of apertures 110 in cheek wall 43 which, together with openings 24 in shoulders 18, permit the circulation of converted air therethrough.

The housing 12 of cord reel 10, together with the hub 42 and its cheek wall 43, are molded in an integrally skinned foamed polyethylene having a density of approximately 0.55 g/cc (ca 35 lbs/cuft.). The material has a somewhat waxy surface which resists the frictional binding of the material to itself and to most other materials including plasticized vinyl chloride, from which the outer cover of extension cord 80 is normally made, thereby facilitating the winding of cord 80 onto hub 42 and its slippage relative to radial wall 14 of the housing, and through opening 82 of the cord reel.

The electrical and flammable properties of foamed polyethylene are not such as to be conductive to its use in forming a housing for exposed electrical contacts. For this reason I prefer to provide the enclosure 64 within the hub of a material having improved flammability and electrical properties, and cover plates 46,48 with their unitarily formed rib structure and skirt walls are suitably molded from a rigid polypropylene stabilized with a flame retardant such as antimony oxide or calcium carbonate.

The foregoing embodiment of the invention is presently preferred and the description thereof is not intended to limit the broad scope of the invention. It is quite possible that the invention may be embodied in other forms which are preferred and fall within the spirit of the claims appended hereto.

I claim:

1. An extension cord reel comprising:
    a housing;
    a hub mounted from said housing for rotation about its axis;
    an extension cord reelable on said hub for storage thereon;
    said cord being operable when at least partially stored on said hub;
    first and second cover plates closing the axial ends of said hub, at least one said cover plate having a skirt wall depending therefrom, said cover plates and skirt wall together defining a compartment within said hub;
    a convenience receptacle mounted from the first said cover plate within said compartment, said convenience receptacle including electrodes electrically connected to said cord, and supporting structure for retaining said electrodes in position, said supporting structure being essentially open at the side thereof facing said second cover plate.

2. An extension cord reel as defined in claim 1, wherein the components defining said compartment are formed from a flame retardant grade of plastic material.

3. An extension cord reel as defined in claim 2, wherein said electrode supporting structure is unitarily formed with the structure defining said compartment.

4. An extension cord reel as defined in claim 2, wherein said housing and said hub are molded from a foamed, rigid polyethylene material.

5. An extension cord reel as defined in claim 2, further including a thermally responsive circuit protecting means which is positioned within said compartment and which is serially connected in one of the conductors of said cord.

6. An extension cord reel as defined in claim 5, wherein said thermally responsive circuit protecting means is a circuit breaker.

7. An extension cord reel as defined in claim 2, wherein an opening is formed in both said hub and said skirt wall, said openings being coincident, and wherein said thermally responsive circuit protecting means locates adjacent to said openings.

8. An extension cord reel as defined in claim 2, wherein said second cover plate is provided with drainage openings therein.

* * * * *